United States Patent
Pundir et al.

(10) Patent No.: US 10,108,547 B2
(45) Date of Patent: Oct. 23, 2018

(54) HIGH PERFORMANCE AND MEMORY EFFICIENT METADATA CACHING

(71) Applicant: NetApp, Inc., Sunnyvale, CA (US)

(72) Inventors: Anshul Pundir, Sunnyvale, CA (US);
Ashwin Pednekar, Sunnyvale, CA (US); Ling Zheng, Saratoga, CA (US);
Michael L. Federwisch, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 285 days.

(21) Appl. No.: 14/989,392

(22) Filed: Jan. 6, 2016

(65) Prior Publication Data
US 2017/0192892 A1 Jul. 6, 2017

(51) Int. Cl.
| G06F 12/12 | (2016.01) |
| G06F 12/0817 | (2016.01) |
| G06F 12/0868 | (2016.01) |
| G06F 12/122 | (2016.01) |
| G06F 12/123 | (2016.01) |
| G06F 12/128 | (2016.01) |

(52) U.S. Cl.
CPC ...... *G06F 12/0824* (2013.01); *G06F 12/0868* (2013.01); *G06F 12/122* (2013.01); *G06F 12/123* (2013.01); *G06F 12/128* (2013.01); *G06F 2212/1008* (2013.01); *G06F 2212/313* (2013.01)

(58) Field of Classification Search
CPC ............. G06F 12/0824; G06F 12/0868; G06F 2212/313; G06F 2212/1008; G06F 12/12–12/128
See application file for complete search history.

(56) References Cited

U.S. PATENT DOCUMENTS

| 5,592,432 A | * | 1/1997 | Vishlitzky | ........... G06F 11/3419 365/230.03 |
| 5,751,993 A | * | 5/1998 | Ofek | ..................... G06F 12/121 710/54 |
| 5,937,425 A | | 8/1999 | Ban | |

(Continued)

OTHER PUBLICATIONS

Cornwall, Michael, "Anatomy of a Solid-state Drive," ACM Queue—Networks, vol. 10, No. 10, Oct. 2012, pp. 1-7.

(Continued)

*Primary Examiner* — Rocio Del Mar Perez-Velez
(74) *Attorney, Agent, or Firm* — Cesari and McKenna, LLP

(57) ABSTRACT

A technique provides memory efficient caching of metadata managed by a volume layer of a storage input/output stack executing on one or more nodes of a cluster. Efficient caching of the metadata in a memory of a node may be realized through the use of a caching data structure, i.e., a page cache, configured to store a key-value pair, wherein the key is an extent key and the value is a metadata page containing the index entries. The page cache illustratively includes two data structures configured to maintain the properties of Least Recently Used (LRU) and Least Frequently Used (LFU) for the cache. The first data structure is a hash table that stores a dense tree metadata page (value) indexed by the extent key. The second data structure is a recycle queue that controls the metadata page stored in the hash table based on spatial and temporal locality of the page.

20 Claims, 14 Drawing Sheets

(56) References Cited

U.S. PATENT DOCUMENTS

| | | | |
|---|---|---|---|
| 6,385,699 B1* | 5/2002 | Bozman | G06F 12/121 |
| | | | 709/217 |
| 6,928,521 B1* | 8/2005 | Burton | G06F 12/0866 |
| | | | 711/114 |
| 7,177,853 B1* | 2/2007 | Ezra | G06F 12/084 |
| 7,249,150 B1 | 7/2007 | Watanabe et al. | |
| 7,464,125 B1 | 12/2008 | Orzag et al. | |
| 7,562,101 B1 | 7/2009 | Jernigan et al. | |
| 7,562,203 B2 | 7/2009 | Scott et al. | |
| 7,668,885 B2 | 2/2010 | Wittke et al. | |
| 7,680,837 B2 | 3/2010 | Yamato | |
| 7,743,035 B2 | 6/2010 | Chen et al. | |
| 7,873,619 B1 | 1/2011 | Faibish et al. | |
| 7,996,636 B1 | 8/2011 | Prakash et al. | |
| 8,082,390 B1 | 12/2011 | Fan et al. | |
| 8,099,396 B1 | 1/2012 | Novick et al. | |
| 8,205,065 B2 | 6/2012 | Matze | |
| 8,341,457 B2 | 12/2012 | Spry et al. | |
| 8,417,987 B1 | 4/2013 | Goel et al. | |
| 8,463,825 B1 | 6/2013 | Harty et al. | |
| 8,489,811 B1 | 7/2013 | Corbett et al. | |
| 8,495,417 B2 | 7/2013 | Jernigan, IV et al. | |
| 8,539,008 B2 | 9/2013 | Faith et al. | |
| 8,560,879 B1 | 10/2013 | Goel | |
| 8,595,595 B1 | 11/2013 | Grcanac et al. | |
| 8,892,818 B1* | 11/2014 | Zheng | G06F 17/30327 |
| | | | 711/114 |
| 9,201,804 B1* | 12/2015 | Egyed | G06F 12/0893 |
| 9,652,405 B1* | 5/2017 | Shain | G06F 12/122 |
| 9,852,076 B1* | 12/2017 | Garg | G06F 12/0868 |
| 2003/0084251 A1* | 5/2003 | Gaither | G06F 12/0804 |
| | | | 711/133 |
| 2003/0120869 A1 | 6/2003 | Lee et al. | |
| 2003/0159007 A1 | 8/2003 | Sawdon et al. | |
| 2005/0144514 A1 | 6/2005 | Ulrich et al. | |
| 2006/0288151 A1 | 12/2006 | McKenney | |
| 2007/0143359 A1 | 6/2007 | Uppala | |
| 2008/0127211 A1 | 5/2008 | Belsey et al. | |
| 2009/0031083 A1 | 1/2009 | Willis et al. | |
| 2009/0037500 A1 | 2/2009 | Kirshenbaum | |
| 2010/0042790 A1 | 2/2010 | Mondal et al. | |
| 2010/0057792 A1 | 3/2010 | Ylonen | |
| 2010/0070701 A1* | 3/2010 | Iyigun | G06F 11/1441 |
| | | | 711/113 |
| 2010/0077380 A1 | 3/2010 | Baker et al. | |
| 2010/0088296 A1 | 4/2010 | Periyagaram et al. | |
| 2010/0228795 A1 | 9/2010 | Hahn et al. | |
| 2011/0035548 A1 | 2/2011 | Kimmel et al. | |
| 2011/0066808 A1 | 3/2011 | Flynn et al. | |
| 2011/0072008 A1 | 3/2011 | Mandal et al. | |
| 2011/0099342 A1 | 4/2011 | Ozdemir | |
| 2011/0191522 A1* | 8/2011 | Condict | G06F 12/123 |
| | | | 711/103 |
| 2011/0213928 A1 | 9/2011 | Grube et al. | |
| 2012/0011176 A1 | 1/2012 | Alzman | |
| 2012/0290788 A1 | 11/2012 | Klemm et al. | |
| 2013/0018854 A1 | 1/2013 | Condict | |
| 2013/0138862 A1 | 5/2013 | Motwani et al. | |
| 2013/0227236 A1* | 8/2013 | Flynn | G11C 16/26 |
| | | | 711/165 |
| 2013/0238832 A1 | 9/2013 | Dronamraju et al. | |
| 2013/0238932 A1 | 9/2013 | Resch | |
| 2013/0268497 A1 | 10/2013 | Baldwin et al. | |
| 2013/0346810 A1 | 12/2013 | Kimmel et al. | |
| 2014/0223029 A1* | 8/2014 | Bhaskar | H03M 7/3088 |
| | | | 709/247 |
| 2014/0281131 A1* | 9/2014 | Joshi | G06F 12/0804 |
| | | | 711/103 |
| 2014/0289476 A1* | 9/2014 | Nayak | G06F 12/0873 |
| | | | 711/133 |
| 2014/0310373 A1 | 10/2014 | Aviles et al. | |
| 2014/0325147 A1 | 10/2014 | Nayak | |

OTHER PUBLICATIONS

"Cuckoo hashing," Wikipedia, http://en.wikipedia.org/wiki/Cuckoo_hash, Apr. 2013, pp. 1-5.

Culik, K., et al., "Dense Multiway Trees," ACM Transactions on Database Systems, vol. 6, Issue 3, Sep. 1981, pp. 486-512.

Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Life," SNIA, Jan. 2013, pp. 1-20.

Art S. Kagel, "two-way merge sort", Dictionary of Algorithms and Data Structures [online], May 2005 [retrieved on Jan. 28, 2015]. Retrieved from the Internet, < URL: http://xlinux.nist.gov/dads/HTMUtwowaymrgsrt.html>, 1 page.

Leventhal, Adam H., "A File System All Its Own," Communications of the ACM Queue, vol. 56, No. 5, May 2013, pp. 64-67.

Lim, H. et al., "SILT: A Memory-Efficient, High-Performance Key-Value Store," Proceedings of the 23rd ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

"Notification of Transmittal of the International Search Report and the Written Opinion of the International Searching Authority, or the Declaration", PCT Application No. PCT/US2014/055138, issued by the European Patent Office, dated Dec. 12, 2014, 13 pages.

ONeil, et al.. "The Log-structured merge-tree (LSM-tree)." Acta Informatica 33.4 (1996): 351-385.

Pagh, Rasmus, et al., "Cuckoo Hashing," Elsevier Science, Dec. 8, 2003, pp. 1-27.

Pagh, Rasmus, "Cuckoo Hashing for Undergraduates," IT University of Copenhagen, Mar. 27, 2006, pp. 1-6.

Rosenblum, Mendel, et al., "The Design and Implementation of a Log-Structured File System," Proceedings of the 13th ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Sears, et al. "bLSM: a general purpose log structured merge tree." Proceedings of the 2012 ACM SIGMOD International Conference on Management Data. ACM, 2012. (12 pages).

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support," UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Wu, Po-Liang, et al., "A File-System-Aware FTL Design for Flash-Memory Storage Systems," Design, Automation & Test in Europe Conference & Exhibition, IEEE, 2009, pp. 1-6.

* cited by examiner

HIGH PERFORMANCE AND MEMORY EFFICIENT METADATA CACHING

BACKGROUND

Technical Field

The present disclosure relates to storage systems and, more specifically, to efficient caching of metadata in memory of a storage system.

Background Information

A storage system typically includes a processor coupled to a memory and one or more storage devices, such as disks embodied as hard disk drives (HDDs) or solid state drives (SSDs), into which information may be entered, and from which information may be obtained, as desired. The storage system may implement a high-level module, such as a file system, to logically organize the information stored on the disks as storage containers, such as files or logical units (LUNs). Each storage container may be implemented as a set of data structures, such as data blocks that store data for the storage containers and metadata blocks that describe the data of the storage containers. For example, the metadata may describe, e.g., identify, storage locations on the disks for the data.

The file system may be configured to perform de-duplication in support of large provisioned capacities, e.g., of data stored on the storage system. However, the amount of metadata required to support such large provisioned capacities may be substantially greater than the memory (e.g., dynamic random access memory) typically available on the storage system. Therefore, it is desirable to efficiently cache the metadata in memory to support consistent high performance of the system.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a technique for providing memory efficient caching of metadata managed by a volume layer of a storage input/output (I/O) stack executing on one or more nodes of a cluster. The metadata, i.e., volume metadata, is illustratively embodied as mappings from addresses, i.e., logical block addresses (LBAs), of a logical unit (LUN) accessible by a host to durable extent keys maintained by an extent store layer of the storage I/O stack. Each extent key is a unique cluster-wide identifier associated with a storage location for an extent, which is a variable length block of data that may be aggregated from one or more write requests directed to a LBA range of the LUN. The volume metadata is organized as a multi-level dense tree metadata structure (dense tree), wherein each level of the dense tree includes volume metadata entries for storing the volume metadata. The volume metadata entries include data entries having extent keys that point directly to user data, as well as index entries that point to metadata pages containing one or more volume metadata entries (such as data entries or other index entries) at next lower level of the dense tree. As such, the technique provides caching priority to metadata pages containing one or more index entries which may point to a large set of data entries that point to user data.

In an embodiment, efficient caching of the metadata in a memory of a node may be realized through the use of a caching data structure, i.e., a page cache, configured to store a key-value pair, wherein the key is an extent key and the value is a metadata page containing the index and/or data entries. The page cache is illustratively organized as data structures configured to maintain properties of Least Recently Used (LRU) and Least Frequently Used (LFU) for the metadata pages in the cache. A first data structure is a hash table having entries, each of which stores a dense tree metadata page (value) indexed by its associated extent key (key). A second data structure is a recycle queue that controls the metadata page stored in the hash table based on spatial and temporal locality of the page. The recycle queue is illustratively organized as a multi-level data structure, wherein each level denotes a priority associated with a metadata page at a time of its insertion into the hash table of the page cache. Each level of the recycle queue may be organized as a doubly-linked list of elements, wherein each element has a pointer referencing a corresponding entry in the hash table that includes a pointer referencing back to that element in the recycle queue. A position of the element within the doubly-linked list denotes how recently the metadata page corresponding to the element was accessed (used). Note that the recycle queue also transforms the page cache into a priority cache by controlling the metadata pages stored in the cache based on priority.

DESCRIPTION

Storage Cluster

Figure 1:
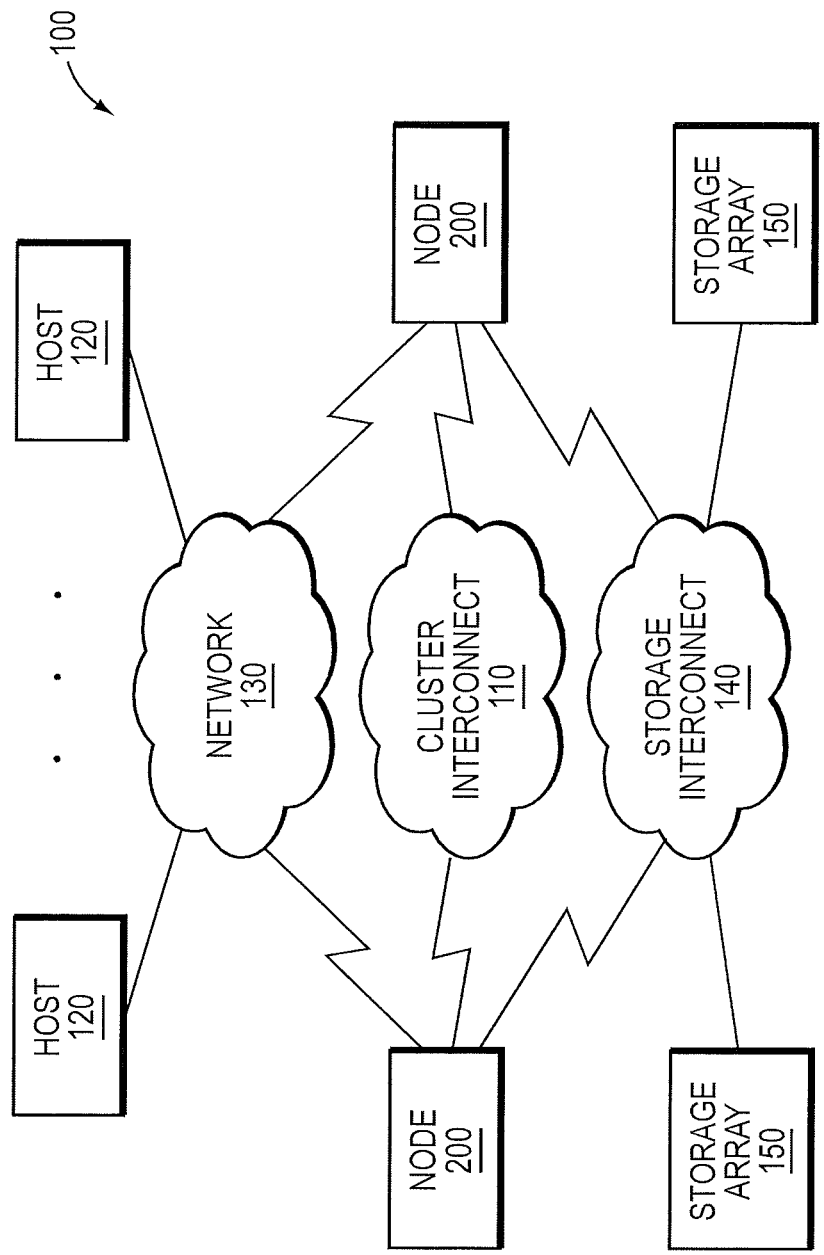
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container on the cluster 100.

Figure 2:
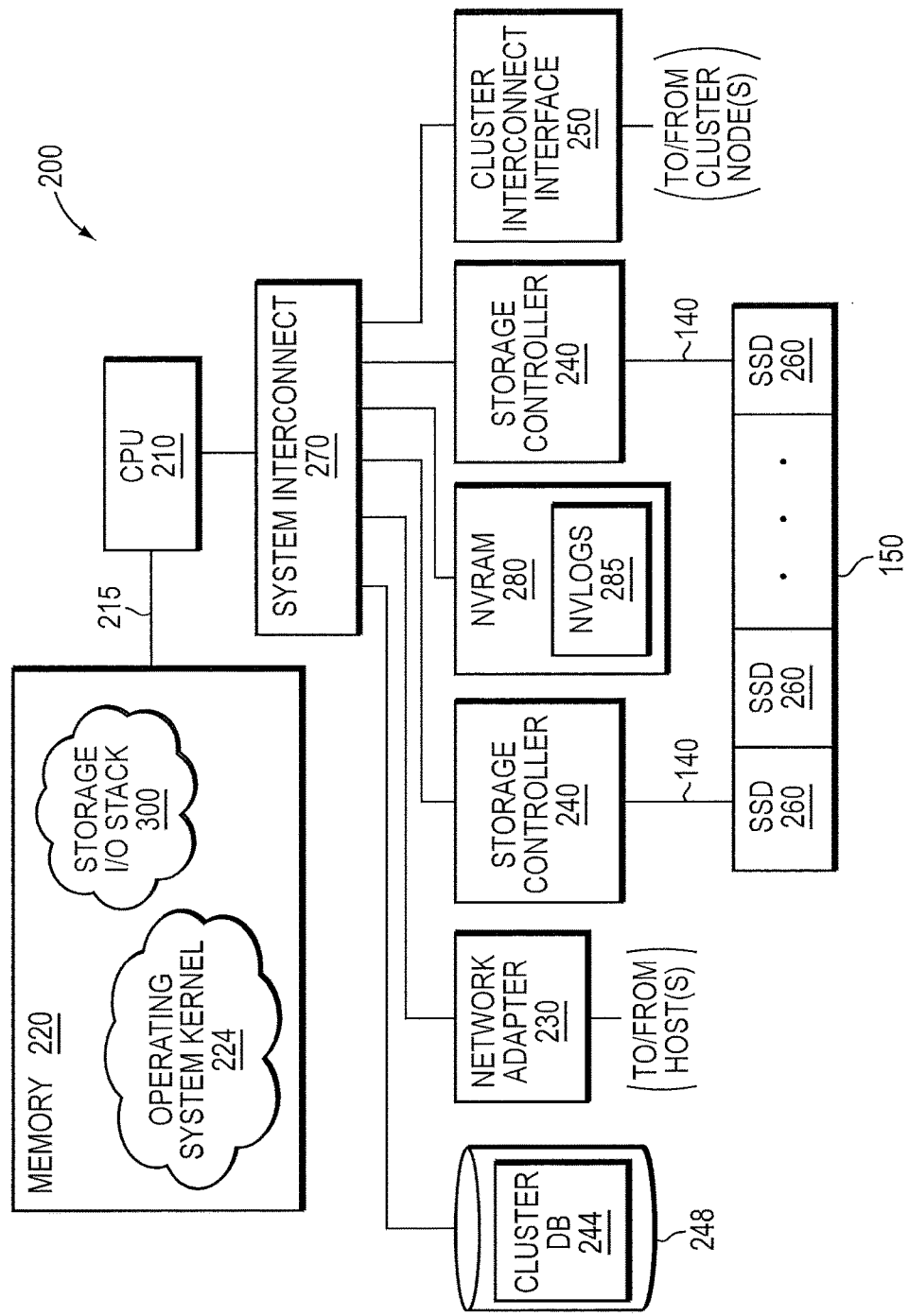
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, one or more storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
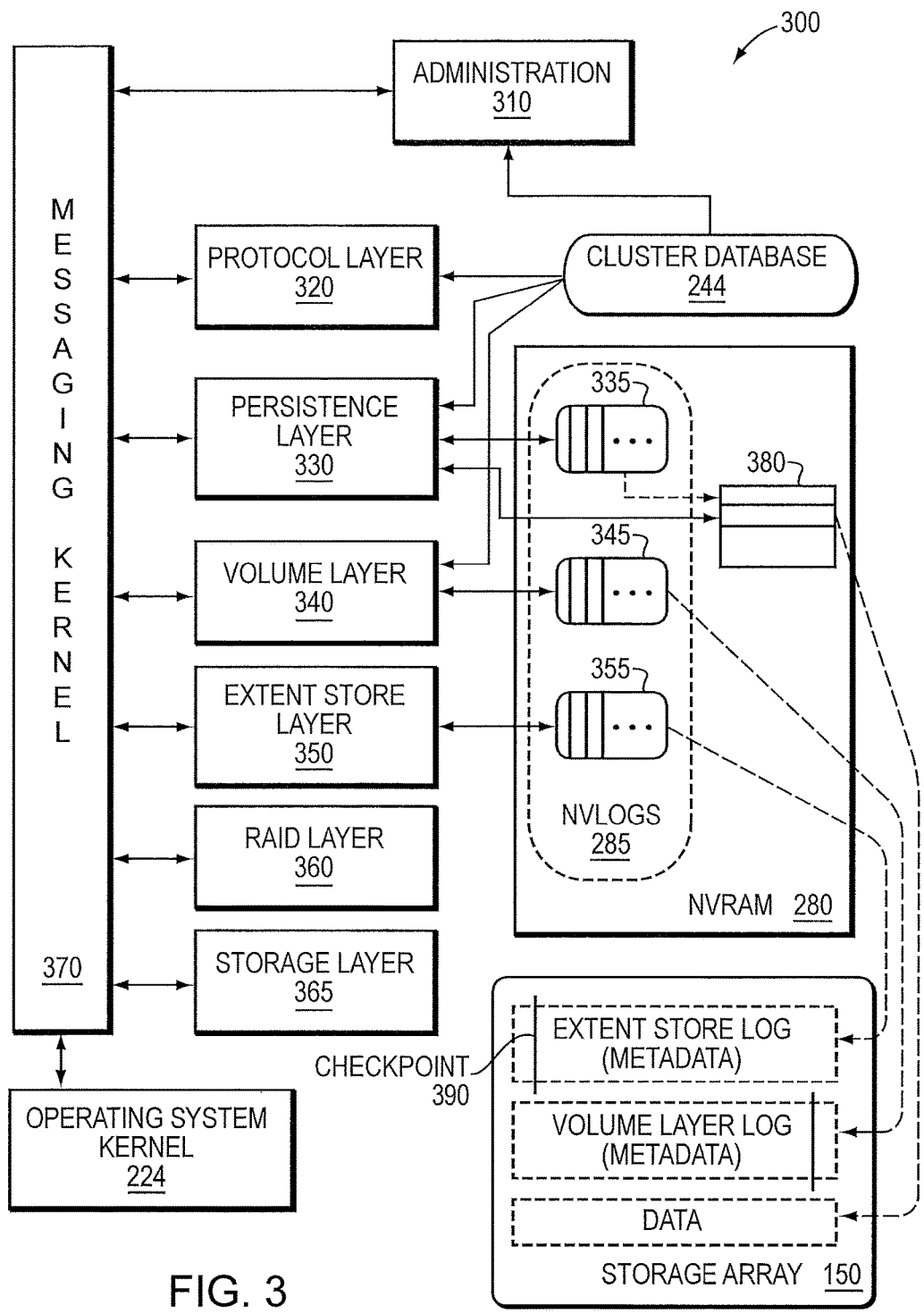
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art the other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations.

In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
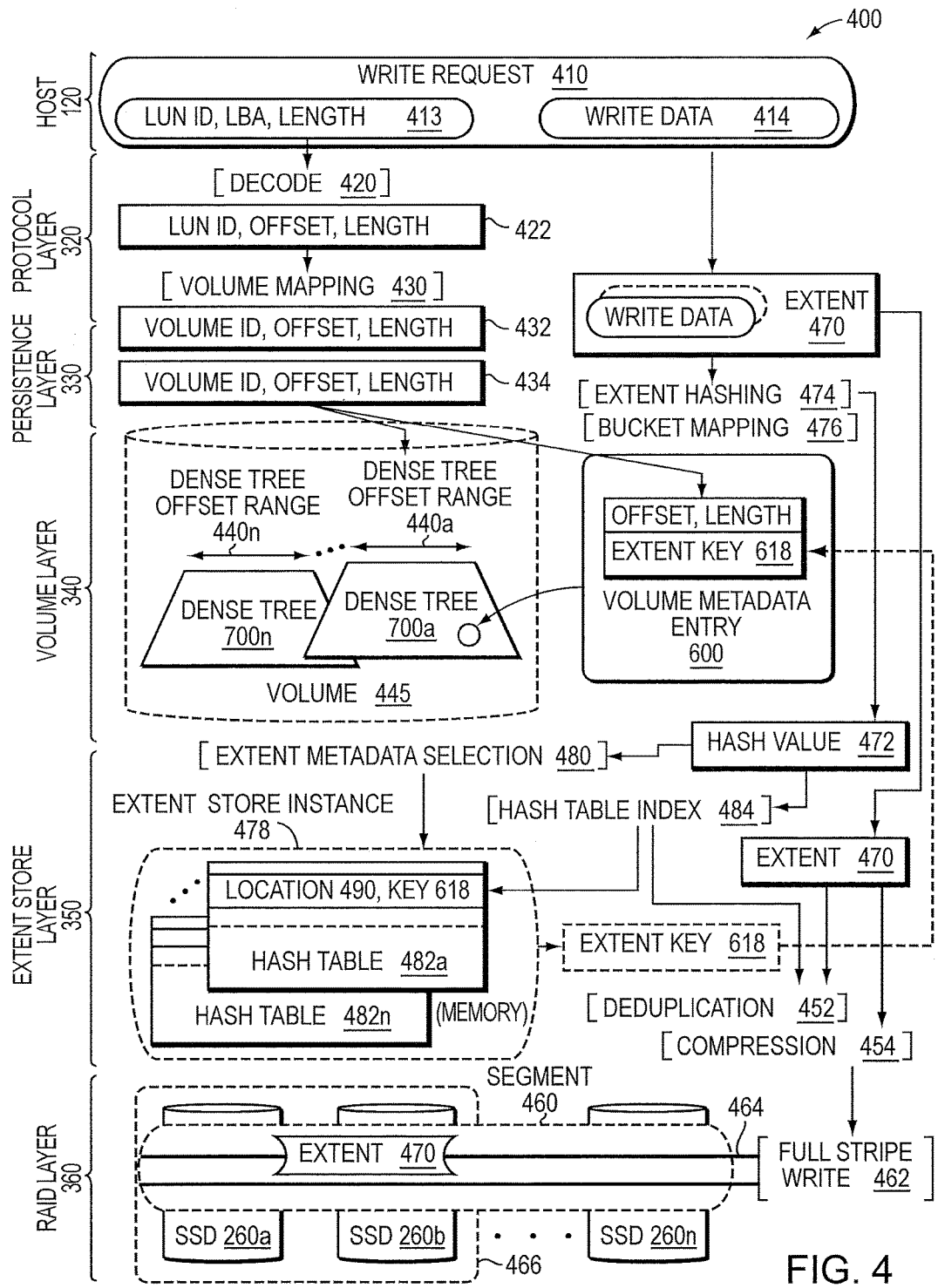
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistent layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistent layer 330 may then pass the write request with aggregated write data including, e.g., the volume ID, offset and length, as parameters 434 of a message to the appropriate volume layer instance. In an embodiment, message passing of the parameters 434 (received by the persistence later) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (i.e., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer the manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 478, and (ii) extracts a hash table index 484 from the hash value 472 to index into the selected hash table and lookup a table entry having an extent key 618 identifying a storage location 490 on SSD 260 for the extent. Accordingly, the extent store layer 350 contains computer executable instructions executed by the CPU 210 to perform operations that implement the extent metadata selection technique 480 described herein. If a table entry with a matching extent key is found, then the SSD location 490 mapped from the extent key 618 is used to retrieve an existing extent (not shown)

from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 618 of the existing extent is passed to the appropriate volume layer instance for storage within an entry (denoted as volume metadata entry 600) of a dense tree metadata structure (e.g., dense tree 700a), such that the extent key 618 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripes 464 across the RAID group 466, illustratively as one or more full write stripes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482n (i.e., as selected by the new candidate extent key), (ii) passes a new extent key (denoted as extent key 618) to the appropriate volume layer instance for storage within an entry (also denoted as volume metadata entry 600) of a dense tree 700 managed by that volume layer instance, and (iii) records a change to extent metadata of the selected hash table in the extent store layer log 355. Illustratively, the volume layer instance selects dense tree 700a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 700. The volume layer instance then inserts the volume metadata entry 600 into the dense tree 700a and records a change corresponding to the volume metadata entry in the volume layer log 345. Accordingly, the I/O (write) request is sufficiently stored on SSD 260 of the cluster.

Read Path

Figure 5:
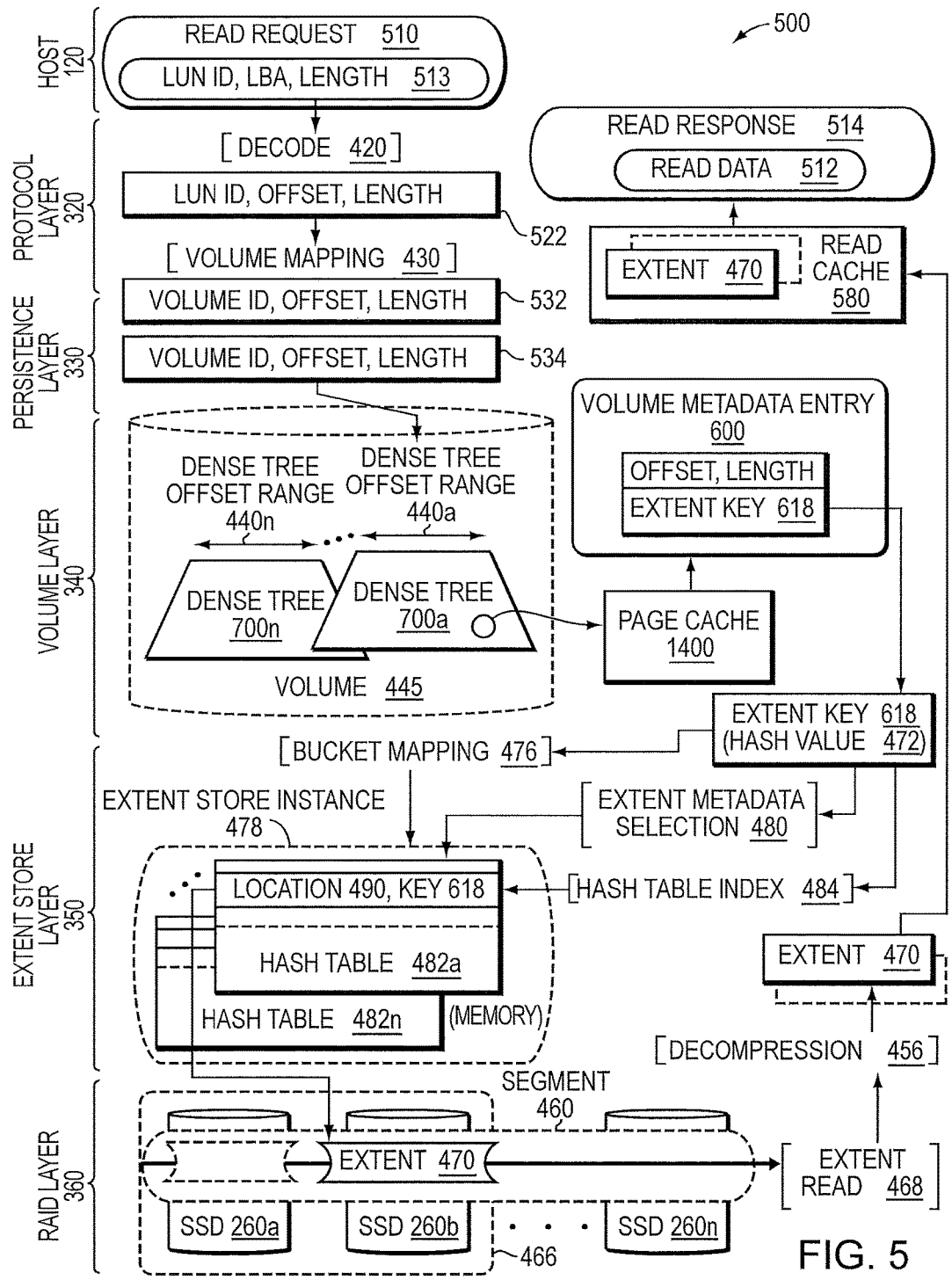
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure (e.g., dense tree 700a) associated with a region (e.g., offset range 440a) of a volume 445 that encompasses the requested offset range (specified by parameters 534). The volume layer instance may further process the read request to search for (lookup) one or more volume metadata entries 600 of the dense tree 700a to obtain one or more extent keys 618 associated with one or more extents 470 within the requested offset range. As described further herein, each dense tree 700 may be embodied as multiple levels of a search structure with possibly overlapping offset range entries at each level. The entries, i.e., volume metadata entries 600, provide mappings from host-accessible LUN addresses, i.e., LBAs, to durable extent keys. The various levels of the dense tree may have volume metadata entries 600 for the same offset, in which case the higher level has the newer entry and is used to service the read request. A top level of the dense tree 700 is illustratively resident in-core and a page cache 1400 may be used to access lower levels of the tree. If the requested range or portion thereof is not present in the top level, a metadata page associated with an index entry at the next lower tree level is accessed. The metadata page (i.e., in the page cache 1400) at the next level is then searched (e.g., a binary search) to find any overlapping entries. This process is then iterated until one or more volume metadata entries 600 of a level are found to ensure that the extent key(s) 618 for the entire requested read range are found. If no metadata entries exist for the entire or portions of the requested read range, then the missing portion(s) are zero filled.

Once found, each extent key 618 is processed by the volume layer 340 to, e.g., implement the bucket mapping technique 476 that translates the extent key to an appropriate extent store instance 478 responsible for storing the requested extent 470. Note that, in an embodiment, each extent key 618 is substantially identical to hash value 472 associated with the extent 470, i.e., the hash value as calculated during the write request for the extent, such that the bucket mapping 476 and extent metadata selection 480 techniques may be used for both write and read path operations. Note also that the extent key 618 may be derived from the hash value 472. The volume layer 340 may then pass the extent key 618 (i.e., the hash value 472 from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 618 (i.e., hash value 472) to perform the extent metadata selection technique 480 that (i) selects an appropriate hash table (e.g., hash table 482a) from a set of hash tables within the extent store instance 478, and (ii) extracts a hash table index 484 from the extent key 618 (i.e., hash value 472) to index into the selected hash table and lookup a table entry having a matching extent key 618 that identifies a storage location 490 on SSD 260 for the extent 470. That is, the SSD location 490 mapped to the extent key 618 may be used to retrieve the existing extent (denoted as extent 470) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to an offset range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA (i.e., offset) ranges of the LUN to data of the LUN (via extent keys) within the respective LBA range. In an embodiment, the volume layer organizes the volume metadata (embodied as volume metadata entries 600) as a data structure, i.e., a dense tree metadata structure (dense tree 700), which maps an offset range within the region to one or more extent keys. That is, LUN data (user data) stored as extents (accessible via extent keys) is associated with LUN offset (i.e., LBA) ranges represented as volume metadata (also stored as extents). Accordingly, the volume layer 340 contains computer executable instructions executed by the CPU 210 to perform operations that organize and manage the volume metadata entries of the dense tree metadata structure described herein.

Figure 6:
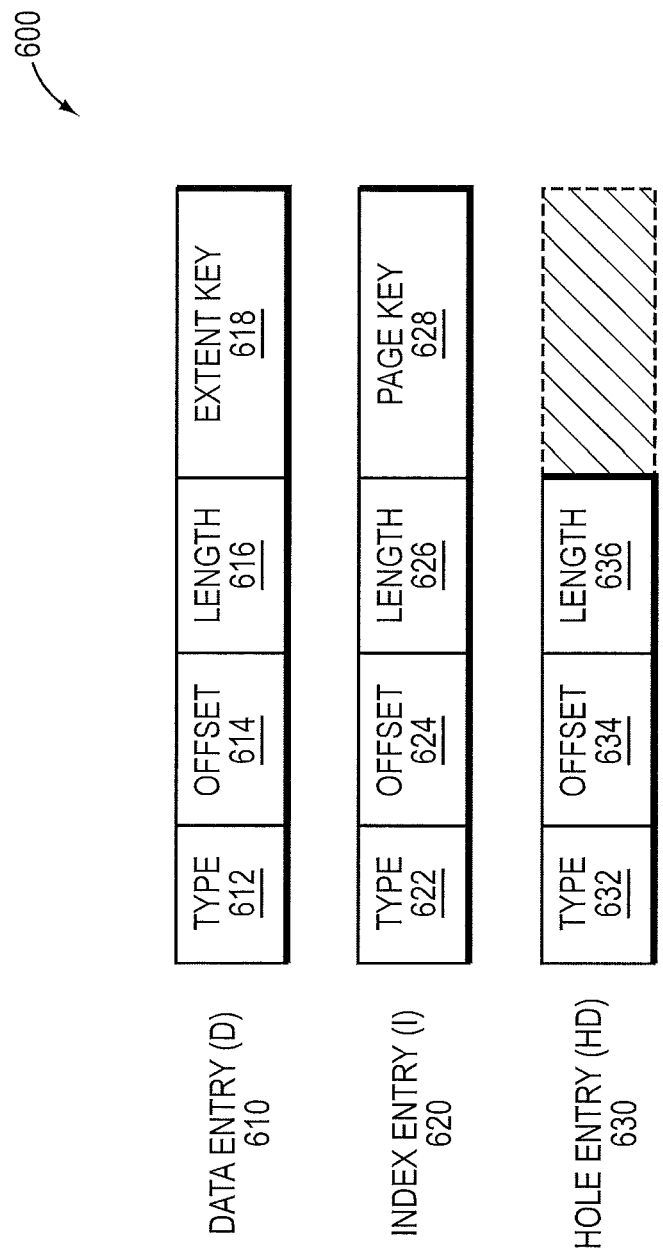
FIG. 6 is a block diagram of various volume metadata entries.

FIG. 6 is a block diagram of various volume metadata entries 600 of the dense tree metadata structure. Each volume metadata entry 600 of the dense tree 700 may be a descriptor that embodies one of a plurality of types, including a data entry (D) 610, an index entry (I) 620, and a hole entry (H) 630. The data entry (D) 610 is configured to map (offset, length) to an extent key for an extent (user data) and includes the following content: type 612, offset 614, length 616 and extent key 618. The index entry (I) 620 is configured to map (offset, length) to a page key (e.g., an extent key) of a metadata page (stored as an extent), i.e., a page containing one or more volume metadata entries, at a next lower level of the dense tree; accordingly, the index entry 620 includes the following content: type 622, offset 624, length 626 and page key 628. Illustratively, the index entry 620 manifests as a pointer from a higher level to a lower level, i.e., the index entry 620 essentially serves as linkage between the different levels of the dense tree. The hole entry (H) 630 represents absent data as a result of a hole punching operation at (offset, length) and includes the following content: type 632, offset 634, and length 636.

In an embodiment, the volume metadata entry types are of a fixed size (e.g., 12 bytes including a type field of 1 byte, an offset of 4 bytes, a length of 1 byte, and a key of 6 bytes) to facilitate search of the dense tree metadata structure as well as storage on metadata pages. Thus, some types may have unused portions, e.g., the hole entry 630 includes less information than the data entry 610 and so may have one or more unused bytes. In an alternative embodiment, the entries may be variable in size to avoid unused bytes. Advantageously, the volume metadata entries may be sized for in-core space efficiency (as well as alignment on metadata pages), which improves both read and write amplification for operations. For example, the length field (616, 626, 636) of the various volume metadata entry types may represent a unit of sector size, such as 512 bytes or 520 bytes, such that a 1 byte length may represent a range of 255×512 bytes=128K bytes.

Figure 7:
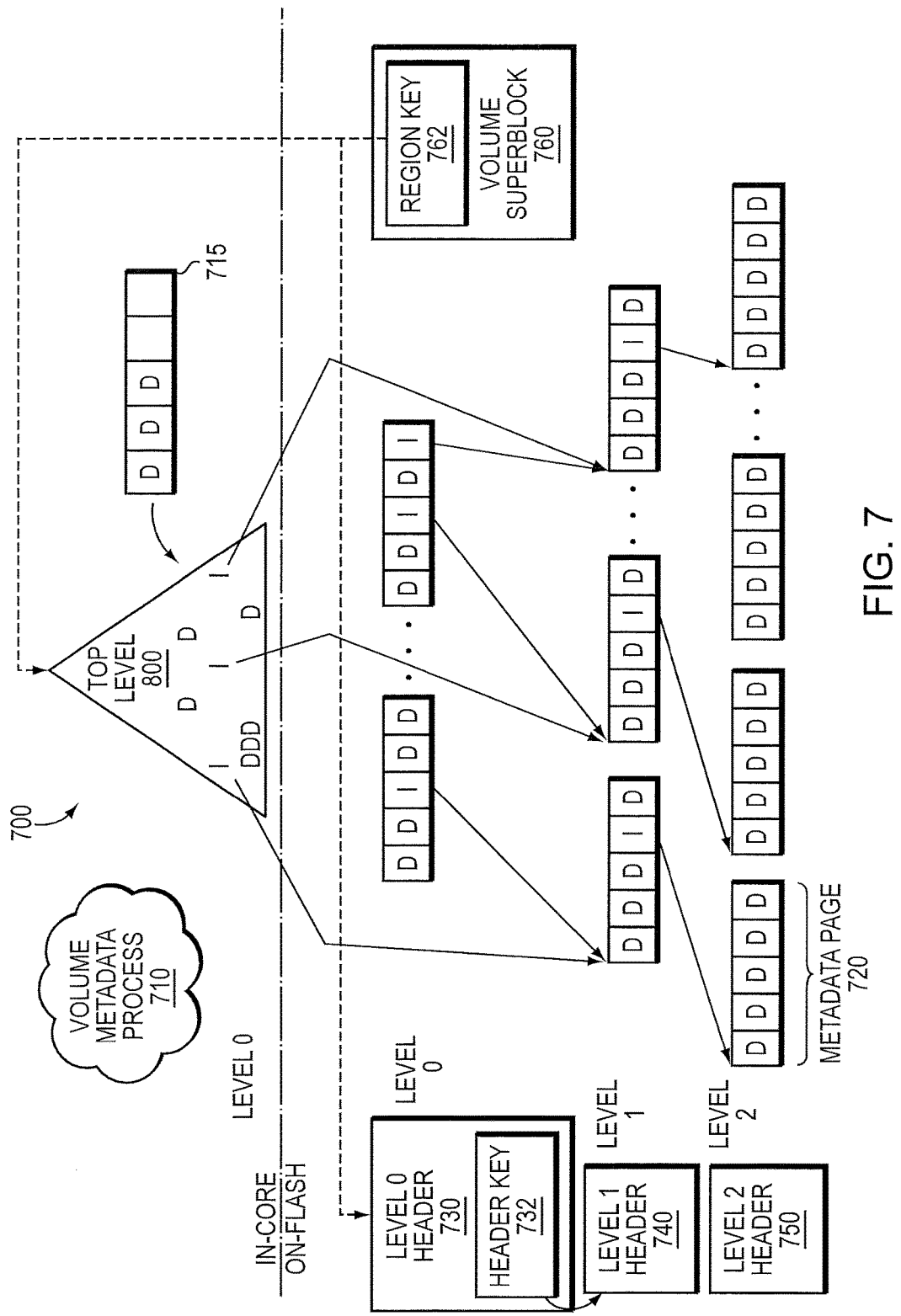
FIG. 7 is a block diagram of a dense tree metadata structure.

FIG. 7 is a block diagram of the dense tree metadata structure that may be advantageously used with one or more embodiments described herein. The dense tree metadata structure 700 is configured to provide mappings of logical offsets within a LUN (or volume) to extent keys managed by one or more extent store instances. Illustratively, the dense tree metadata structure is organized as a multi-level dense tree 700, where a top level 800 represents recent volume metadata changes and subsequent descending levels represent older changes. Specifically, a higher level of the dense tree 700 is updated first and, when that level fills, an adjacent lower level is updated, e.g., via a merge operation. A latest version of the changes may be searched starting at the top level of the dense tree and working down to the descending levels. Each level of the dense tree 700 includes fixed size records or entries, i.e., volume metadata entries 600, for storing the volume metadata. A volume metadata process 710 illustratively maintains the top level 800 of the dense tree in memory (in-core) as a balanced tree that enables indexing by offsets. The volume metadata process 710 also maintains a fixed sized (e.g., 4 KB) in-core buffer as a staging area (i.e., an in-core staging buffer 715) for volume metadata entries 600 inserted into the balanced tree (i.e., top level 800). Each level of the dense tree is further maintained on-flash as a packed array of volume metadata entries, wherein the entries are stored as extents illustratively organized as fixed sized (e.g., 4 KB) metadata pages 720. Notably, the staging buffer 715 is de-staged to SSD upon a trigger, e.g. the staging buffer is full. Each metadata page 720 has a unique identifier (ID), which guarantees that no two metadata pages can have the same content. Illustratively, metadata may not be de-duplicated by the extent store layer 350.

In an embodiment, the multi-level dense tree 700 includes three (3) levels, although it will be apparent to those skilled in the art that additional levels N of the dense tree may be included depending on parameters (e.g., size) of the dense tree configuration. Illustratively, the top level 800 of the tree is maintained in-core as level 0 and the lower levels are maintained on-flash as levels 1 and 2. In addition, copies of the volume metadata entries 600 stored in staging buffer 715 may also be maintained on-flash as, e.g., a level 0 linked list. A leaf level, e.g., level 2, of the dense tree contains data entries 610, whereas a non-leaf level, e.g., level 0 or 1, may contain both data entries 610 and index entries 620. Each index entry (I) 620 at level N of the tree is configured to point to (reference) a metadata page 720 at level N+1 of the tree. Each level of the dense tree 600 also includes a header (e.g., level 0 header 730, level 1 header 740 and level 2 header 750) that contains per level information, such as reference counts associated with the extents. Each upper level header contains a header key (an extent key for the header, e.g., header key 732 of level 0 header 730) to a corresponding lower level header. A region key 762 to a root, e.g., level 0 header 730 (and top level 800), of the dense tree 700 is illustratively stored on-flash and maintained in a volume root extent, e.g., a volume superblock 760. Notably, the volume superblock 760 contains region keys to the roots of the dense tree metadata structures for all regions in a volume.

Figure 8:
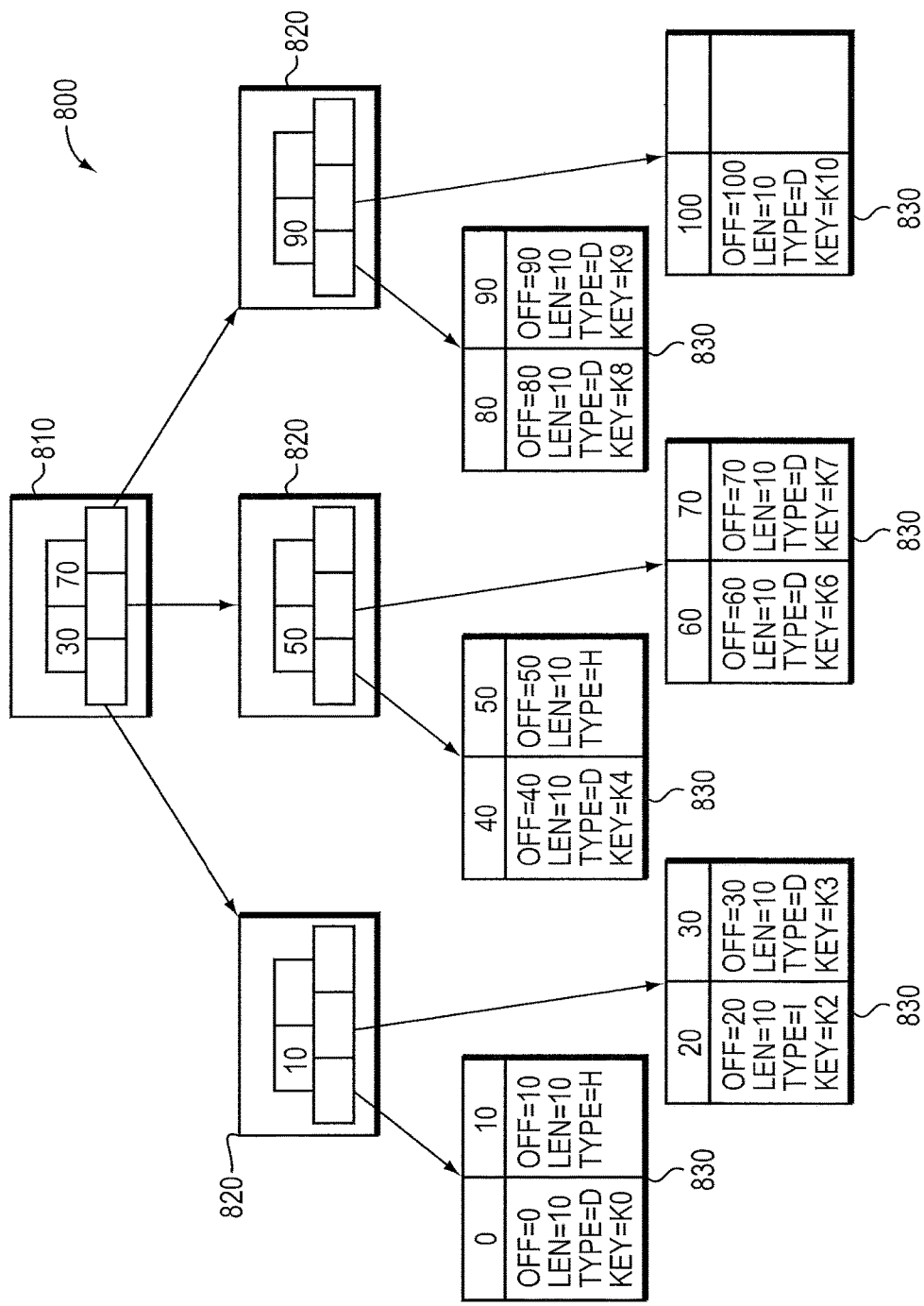
FIG. 8 is a block diagram of a top level of the dense tree metadata structure.

FIG. 8 is a block diagram of the top level 800 of the dense tree metadata structure. As noted, the top level (level 0) of the dense tree 700 is maintained in-core as a balanced tree, which is illustratively embodied as a B+ tree data structure. However, it will be apparent to those skilled in the art that other data structures, such as AVL trees, Red-Black trees, and heaps (partially sorted trees), may be advantageously used with the embodiments described herein. The B+ tree (top level 800) includes a root node 810, one or more internal nodes 820 and a plurality of leaf nodes (leaves) 830. The volume metadata stored on the tree is preferably organized in a manner that is efficient both to search, in order to service read requests, and to traverse (walk) in ascending order of offset to accomplish merges to lower levels of the tree. The B+ tree has certain properties that satisfy these requirements, including storage of all data (i.e., volume metadata entries 600) in leaves 830 and storage of the leaves as sequentially accessible, e.g., as one or more linked lists. Both of these properties make sequential read requests for write data (i.e., extents) and read operations for dense tree merge efficient. Also, since it has a much higher fan-out than a binary search tree, the illustrative B+ tree results in more efficient lookup operations. As an optimization, the leaves 830 of the B+ tree may be stored in page cache 1400, making access of data more efficient than other trees. In addition, resolution of overlapping offset entries in the B+ tree optimizes read requests of extents. Accordingly, the larger the fraction of the B+ tree (i.e., volume metadata) maintained in-core, the less loading (reading) of metadata from SSD is required so as to reduce read amplification.

Figure 9:
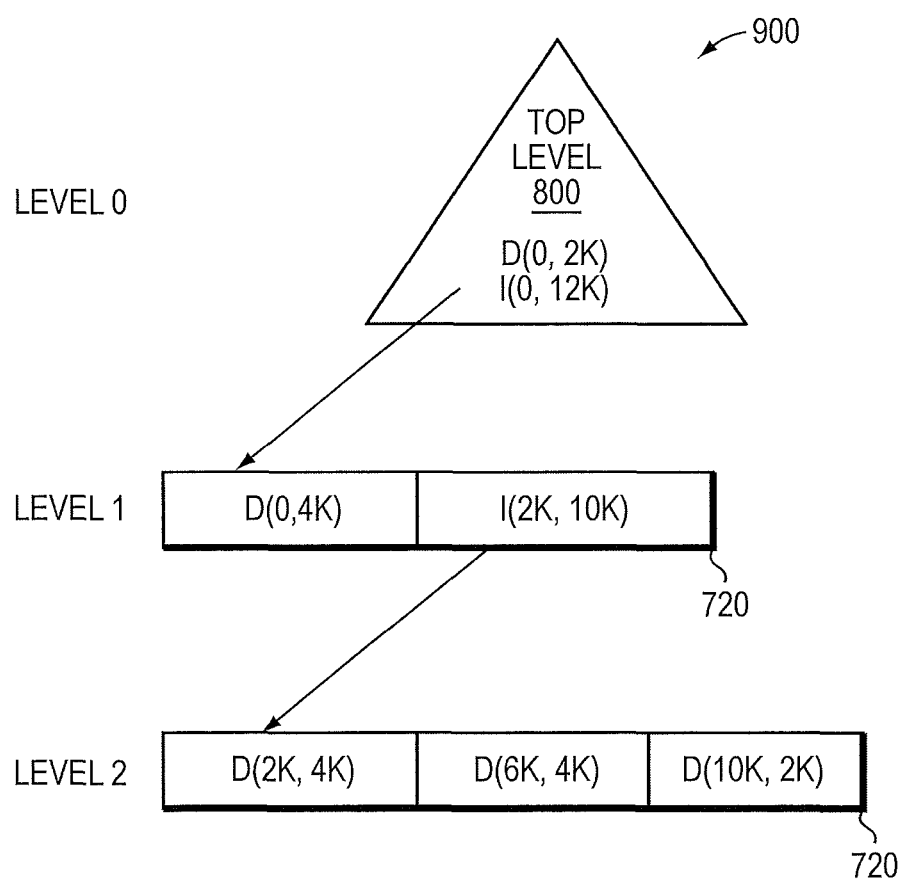
FIG. 9 illustrates mapping between levels of the dense tree metadata structure.

FIG. 9 illustrates mappings 900 between levels of the dense tree metadata structure. Each level of the dense tree 700 includes one or more metadata pages 720, each of which contains multiple volume metadata entries 600. As noted, each volume metadata entry 600 has a fixed size, e.g., 12 bytes, such that a predetermined number of entries may be packed into each metadata page 720. The data entry (D) 610 is a map of (offset, length) to an address of (user) data which is retrievable using an extent key 618 (i.e., from an extent store instance). The (offset, length) illustratively specifies an offset range of a LUN. The index entry (I) 620 is a map of (offset, length) to a page key 628 of a metadata page 720 at the next lower level. Illustratively, the offset in the index entry (I) 620 is the same as the offset of the first entry in the metadata page 720 at the next lower level. The length 626 in the index entry 620 is illustratively the cumulative length of all entries in the metadata page 720 at the next lower level (including gaps between entries).

For example, the metadata page 720 of level 1 includes an index entry "I(2K,10K)" that specifies a starting offset 2K and an ending offset 12K (i.e., 12K=2K+10K); the index entry (I) illustratively points to a metadata page 720 of level 2 covering the specified range. An aggregate view of the data entries (D) packed in the metadata page 720 of level 2 covers the mapping from the smallest offset (e.g., 2K) to the largest offset (e.g., 12K). Thus, each level of the dense tree 700 may be viewed as an overlay of an underlying level. For instance the data entry "D(0,4K)" of level 1 overlaps 2K of the underlying metadata in the page of level 2 (i.e., the range 2K to 4K).

Figure 10:
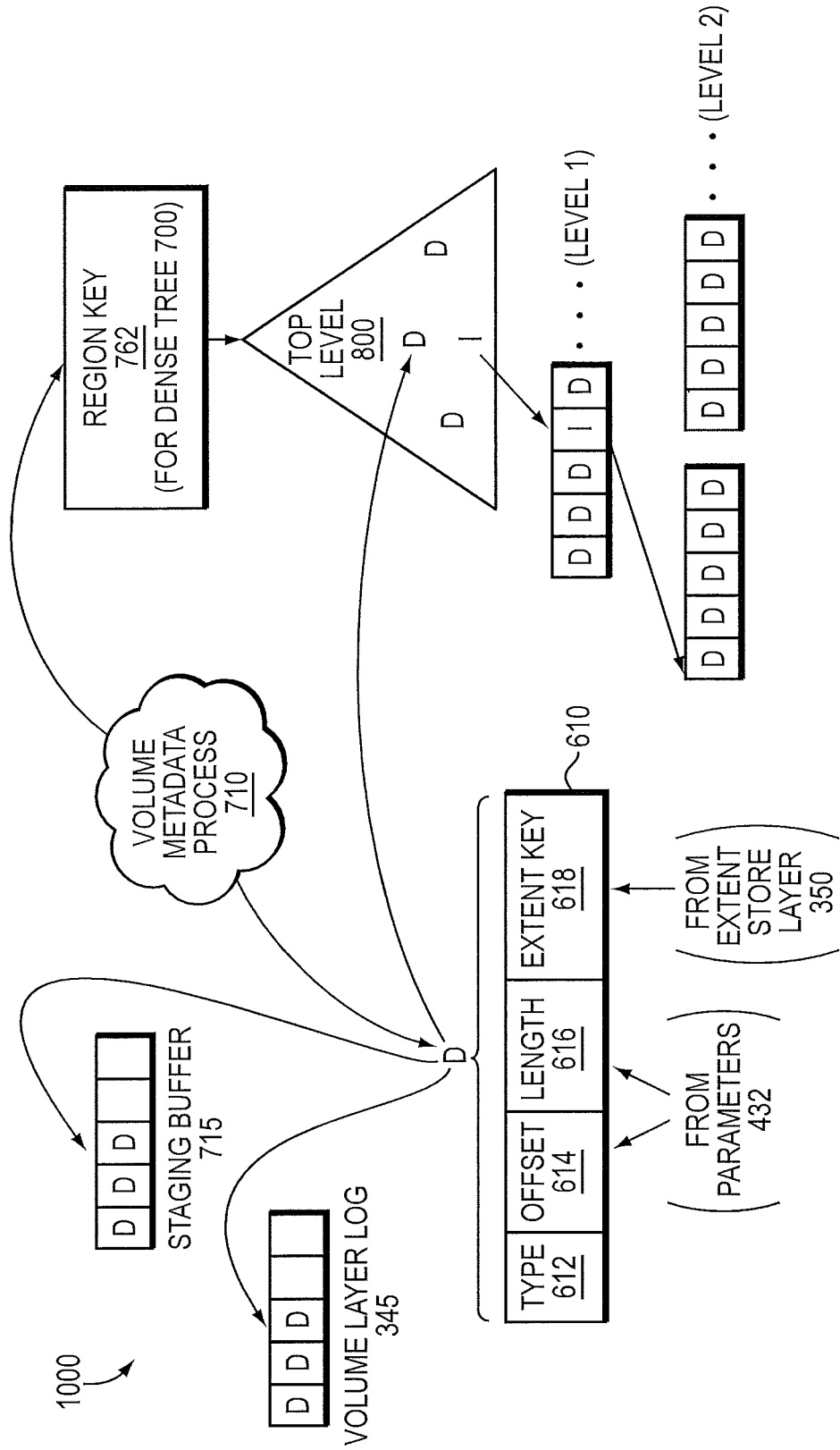
FIG. 10 illustrates a workflow for inserting a volume metadata entry into the dense tree metadata structure in accordance with a write request.

In one or more embodiments, operations for volume metadata managed by the volume layer 340 include insertion of volume metadata entries, such as data entries 610, into the dense tree 700 for write requests. As noted, each dense tree 700 may be embodied as multiple levels of a search structure with possibly overlapping offset range entries at each level, wherein each level is a packed array of entries (e.g., sorted by offset) and where leaf entries have an offset range (offset, length) and an extent key. FIG. 10 illustrates a workflow 1000 for inserting a volume metadata entry into the dense tree metadata structure in accordance with a write request. In an embodiment, volume metadata updates (changes) to the dense tree 700 occur first at the top level of the tree, such that a complete, top-level description of the changes is maintained in memory 220. Operationally, the volume metadata process 710 applies the region key 762 to access the dense tree 700 (i.e., top level 800) of an appropriate region (e.g., offset range 440 as determined from the parameters 432 derived from a write request 410). Upon completion of the write request, the volume metadata process 710 creates a volume metadata entry, e.g., a new data entry 610, to record a mapping of offset/length-to-extent key (i.e., offset range-to-user data). Illustratively, the new data entry 610 includes an extent key 618 (i.e., from the extent store layer 350) associated with data (i.e., extent 470) of the write request 410, as well as offset 614 and length 616 (i.e., from the write parameters 432) and type 612 (i.e., data entry D). The volume metadata process 710 then updates the volume metadata by inserting (adding) the data entry D into the level 0 staging buffer 715, as well as into the top level 800 of dense tree 700 and the volume layer log 345, thereby signifying that the write request is stored on SSD 260 of the cluster.

Figure 11:
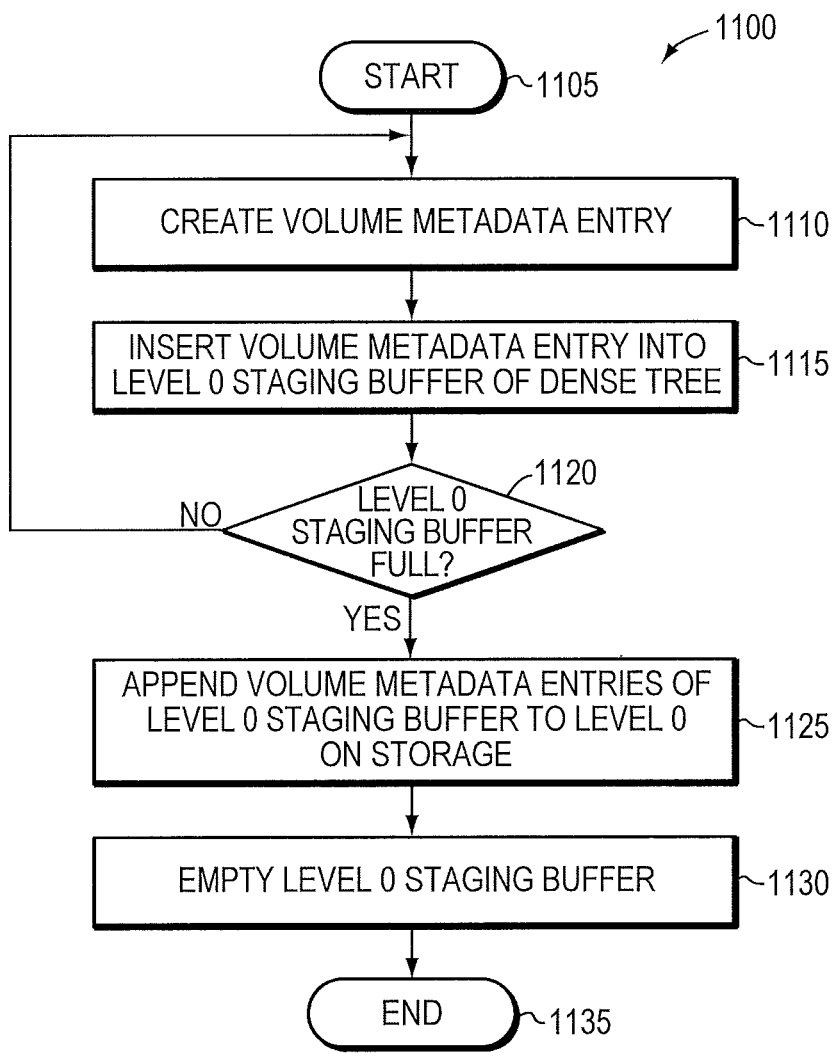
FIG. 11 is an example simplified procedure for inserting a volume metadata entry into the dense tree metadata structure in accordance with the write request.

FIG. 11 is an example simplified procedure 1100 for inserting a volume metadata entry into the dense tree metadata structure in accordance with a write request. The procedure starts at step 1105 and proceeds to step 1110 where, at the completion of the write request, the volume metadata process creates a volume metadata entry, e.g., a new data entry, to record a mapping of offset/length-to-extent key. At step 1115, the volume metadata process inserts (adds) the volume metadata entry into level 0 of the dense tree, i.e., into the level 0 staging buffer. Illustratively, the entry is also added to the top level of the dense tree as a leaf node and to the volume layer log. At step 1120, a determination is made as to whether the level 0 staging buffer is full. If not, the procedure returns to step 1110; otherwise, if the buffer is full, the volume metadata entries stored in the level 0 staging buffer are appended to level 0 of the dense tree on SSD at step 1125 (i.e., de-staged and stored on SSD). At step 1130, the level 0 staging buffer is emptied to allow space for new volume metadata entries. The procedure then ends at step 1135.

In an embodiment, the staging buffer 715 is sized to determine the frequency of append operations, i.e., step 1125 of procedure 1100. For example, an 8 KB staging buffer with volume metadata entries of 12 bytes in size is appended after 8192/12≈682 operations. It should be noted that previously described merge operations are distinct from the append procedure described immediately above in FIG. 11. Merge operations illustratively occur between a higher level in the dense tree and a lower level in the dense tree (e.g., level 0 in-core to level 1 on SSD and level 1 on SSD to level 2 on SSD) using a merge sort operation. On the other hand, append operations occur ostensibly from the in-core level 0 (i.e., the staging buffer) to level 0 on SSD using an append operation.

Figure 12:
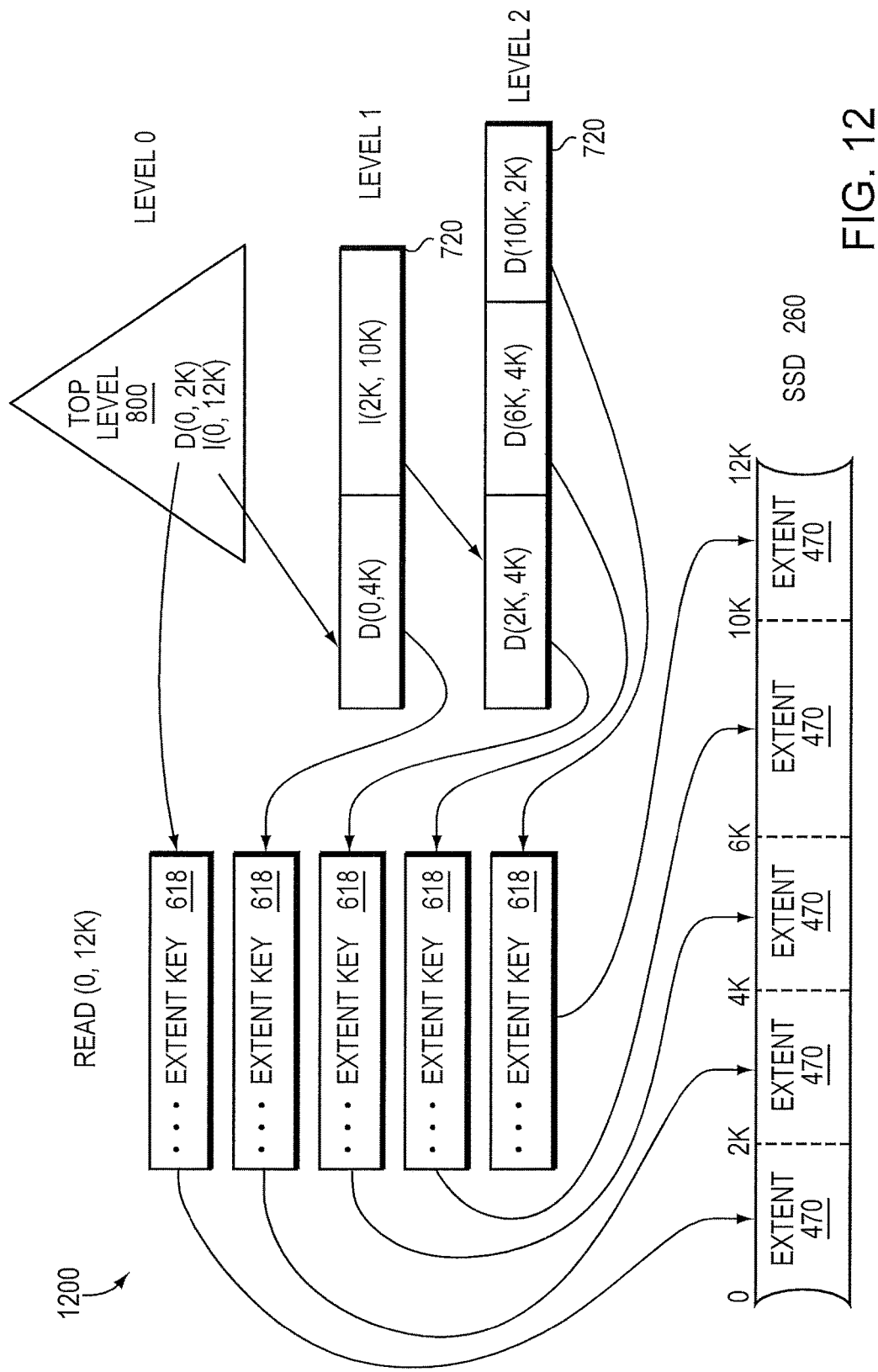
FIG. 12 illustrates a workflow for searching the dense tree metadata structure for one or more volume metadata entries in accordance with a read request.

Operations for volume metadata managed by the volume layer 340 also include lookup (search) of the dense tree 700 for volume metadata entries, such as data entries 610, for read requests. FIG. 12 illustrates a workflow 1200 for searching the dense tree metadata structure for one or more volume metadata entries in accordance with a read request. For the read request, level 0 (i.e., the top level 800 and/or the level 0 staging buffer 715) is first searched for overlapping entries (such as data entries D and index entries I), and one or more metadata pages 720 associated with index entries I at one or more next levels (i.e., level 1 and/or level 2) may be read (e.g., loaded in-core). A binary search is then performed on each metadata page 720 to find any overlapping entries.

For example, assume a read request is directed to a portion of data ranging from 0-12K, i.e., Read 0,12K (offset, length). The volume layer 340 (e.g., volume metadata process 710) processes the read request to initiate a search at level 0 (e.g., top level 800) where a data entry D is found that covers a portion (0-2K) of the requested data. Thus, the data entry D related to the 0-2K portion (range) of the requested data is read from level 0 to obtain an extent key 618 associated with an extent 470 storing the 0-2K portion of the data on SSD 260. An index entry "I(0,12K)" of top level 800 indicates that the additional requested data for the range is located at one or more lower levels of the tree. Accordingly, a level 1 metadata page 720 corresponding to "I(0K-12K)" is searched (e.g., a binary search) and another data entry D is found that covers portion (0-4K) of the requested data. Here, the data entry D related to the 0-4K portion of the data is read from level 1 to obtain an extent key 618 associated with an extent 470 storing a 2K-4K portion (range) of the data on SSD. Note that the 0-2K portion of the data read from the extent 470 referenced by level 0 is more recent than the corresponding portion of data referenced by level 1 (i.e., newer data in the upper level range overlays older data in a lower level range); accordingly, only the 2K-4K portion (range) of the data is used from the extent referenced by level 1 to form the response to the read request.

Another index entry "I(2K,10K)" (i.e., offset, length) in the level 1 page indicates that further additional requested data for the range is located at a next lower level (level 2). A level 2 metadata page 720 corresponding (mapping) to "I(2K, 10K)" is then searched to discover three data entries D that cover the remaining portions (2K, 4K), (6K, 4K) and (10K, 2K) of the requested data. Illustratively, the data entry D(2K, 4K) related to the 2K-6K portion (range) of the data is read from level 2 to obtain the extent key 618 associated with an extent 470 storing a 4K-6K portion of the data on SSD 260. Here again, the 2K-4K portion (range) of the data read from the extent 470 referenced by level 1 is more recent than the corresponding portion of data referenced by level 2; accordingly, only the 4K-6K portion (range) of the data is read from the extent referenced by level 2. Lastly, the data entries D(6K, 4K) and D(10K, 2K) related to the 6K-10K and 10K-12K portions (ranges) of the data are read to obtain extent keys 618 associated with the extents 470 storing those portions of the data on SSD 260 to complete the read request. Notably, the volume layer 350 may also use the page cache 1400 to access the lower levels of the dense tree stored on SSD.

In an embodiment, different levels of the dense tree 700 may have volume metadata entries 600 for the same offset, in which case, the higher level has the newer entry and is used to serve the read request. In other words, higher levels (e.g., level 0) of the dense tree 700 contain recent metadata mappings and, as such, are searched first to satisfy the read request. For instance, if the read request was directed to 0-2K (range), the data may be found completely at D(0, 2K) from the top level 800 (or level 0 buffer 715). Older entries are located at the lower levels (e.g., level 2) of the dense tree because the tree grows from the top down. Moreover, if the read access may be resolved at levels 0 and 1, there is no need to access level 2. That is, if the read request was directed to 0-4K, the first 2K may be found at level 0 and the second 2K (2K-4K) may be found at level 1, and the request may be completely satisfied without searching level 2. Accordingly, the organization of the dense tree data structure, i.e., where the top level 800 represents recent volume metadata changes and subsequent descending levels 1-2 represent older changes, decreases search operations to storage array 150 (SSD 260), thereby reducing both write and read amplification.

For example, if a dense tree spans an offset range of 16 GB with an average extent size of 4 KB, approximately 4 million entries (16 GB/4 KB=4,194,304) are required in the leaves of the dense tree (e.g., stored at level 2 on SSD). Further, if the multiplication ratio between adjacent levels of the dense tree is 8, then level 1 has approximately 500K entries (4,192,304/8=524,288) and level 0 has 64K (exactly, 524,288/8) entries. Thus when level 0 is filled in-core, 524,288 entries may be written (i.e., overwritten) in level 1 to SSD. If each entry is assumed to occupy 12 bytes (i.e., size of the metadata entry 600), the write amplification would be 500K entries (level 1)×12 bytes (number of bytes per entry)/64K (number of entries to fill level 0, i.e., one per user request)=96 bytes per 4 KB extent written. Further, the same write amplification occurs between level 1 and level 2: 4M entries (level 2)×12 bytes per entry/500K (number of entries on level 1)=96 bytes. Thus a total of 96+96=192 bytes of metadata are written per 4 KB extent written or approximately 4.7% metadata overhead, i.e. a write amplification of approximately 1.023 for volume offset/range metadata.

Figure 13:
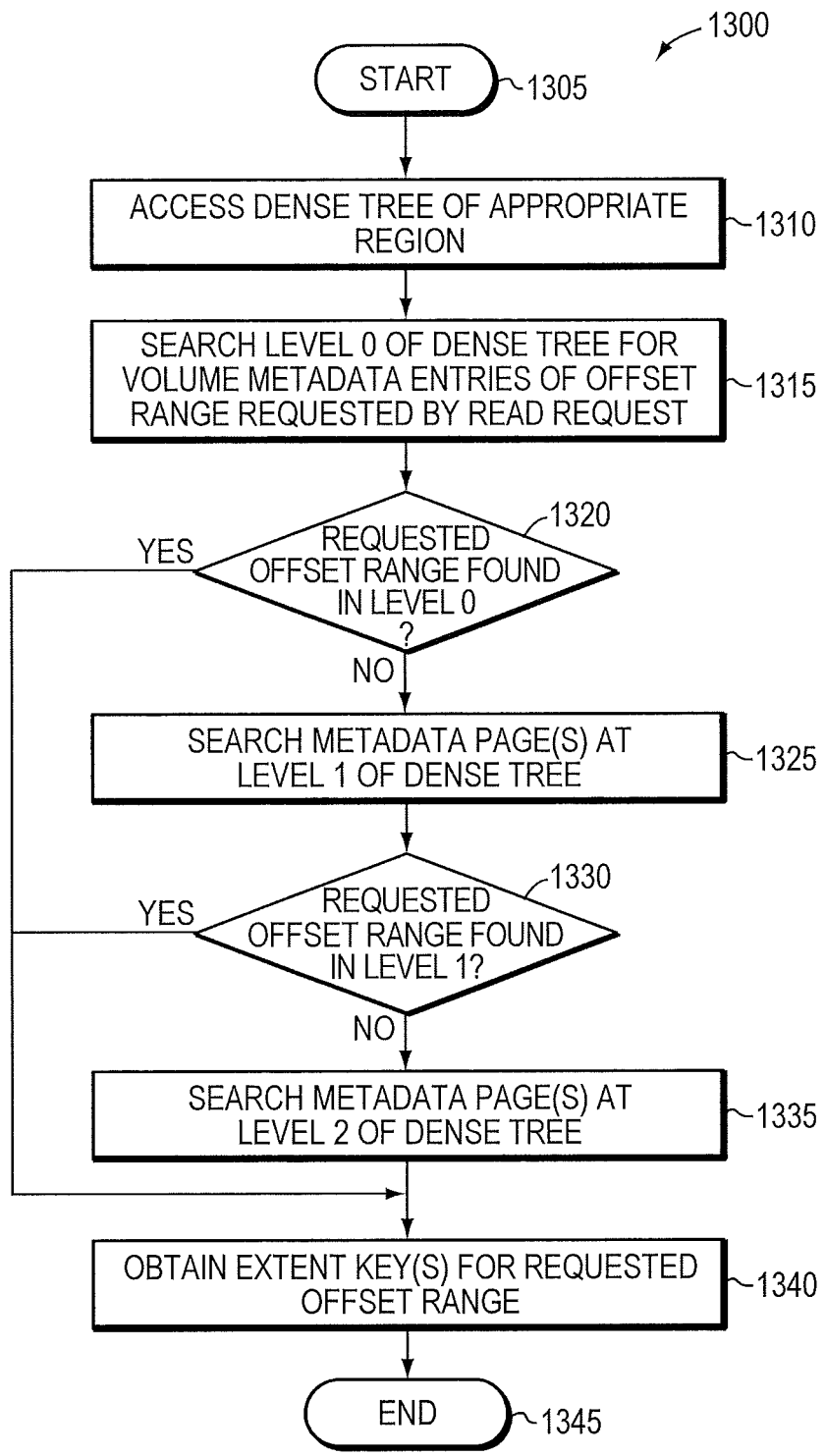
FIG. 13 is an example simplified procedure for searching the dense tree metadata structure for one or more volume metadata entries in accordance with the read request.

FIG. 13 is an example simplified procedure 1300 for searching the dense tree metadata structure for one or more volume metadata entries in accordance with a read request. The procedure starts at step 1305 and proceeds to step 1310 where, during the read request, the volume metadata process accesses the dense tree of the appropriate region to search for (lookup) volume metadata needed to locate the extent key(s) related to the range of the read request. As noted, determination of which region (i.e., offset range) to search is based on the particular offset in the read request. At step 1315, the volume metadata process searches level 0 (top level and/or staging buffer) of the dense tree for overlapping volume metadata entries, e.g., data entries and index entries, of the offset range requested by the read request. At step 1320, a determination is made as to whether the requested offset range is found in level 0. If so, the extent key(s) for the entire requested range is obtained at step 1340 and the procedure ends at Step 1345. If the requested offset range is not found in level 0, then the metadata page(s) associated with the index entry(s) at level 1 is searched (e.g., a binary search or search based on the dense tree data structure, such as a heap search) for one or more overlapping entries (step 1325). Notably the read request may straddle a plurality of extents, unless a metadata entry in the dense tree (i.e., associated with one extent) precisely matches the requested offset range. In addition, metadata pages of lower levels on SSD may be cached in page cache 1400 and loaded on demand. At step 1330, a determination is made as to whether the requested offset range is found in level 1. If so, the extent key(s) for the entire requested range is obtained at step 1340 and the procedure ends at step 1345. If the requested offset range is not found in level 1, then the metadata page(s) associated with the index entry(s) at level 2 is searched (a binary search) to find one or more overlapping entries (step 1335). At step 1340, the extent key(s) for the entire requested offset range is obtained and, at step 1345, the procedure ends.

Memory Efficient Metadata Caching

The embodiments described herein are directed to a technique for providing memory efficient caching of metadata managed by the volume layer of the storage I/O stack. As previously noted, the metadata, i.e., volume metadata, is embodied as mappings from LBAs of a LUN to extent keys maintained by the extent store layer. The volume metadata is organized as a multi-level dense tree, wherein each level of the dense tree includes volume metadata entries for storing the volume metadata. The volume metadata entries include data entries (D) that point directly to user data, as well as index entries (I) that point to metadata pages containing one or more volume metadata entries (such as data entries) at next lower level of the dense tree. In the dense tree, L0 and L1 may contain index entries, whereas L2 contains data entries. As such, the technique provides caching priority to metadata pages containing one or more index entries which may point to a large set of user data. In other words, the technique provides caching priority to metadata pages in L1 over L2 because L1 metadata pages contain index entries that are likely to point to a larger set of user data than a metadata page containing only data entries. L1 also has greater temporal locality (i.e., no older than a time of a last merge operation) than L2 (aggregation of many merge operations) and maintaining L1 metadata pages in memory (i.e., spatial locality) provides a high performance feature of one (1) metadata read operation for each host read request. As such, temporal and spatial locality in the user data requested by the host enables memory efficient metadata caching.

In an embodiment, efficient caching of the metadata in memory 220 of node 200 may be realized through the use of a caching data structure, i.e., page cache 1400, configured to store a key-value pair, wherein the key is an extent key and the value includes a metadata page containing index and/or data entries. The page cache 1400 logically resides in the storage I/O stack 300 (e.g., as a sub-"layer") between the volume layer and extent store layer to facilitate reading of metadata pages used by the volume layer; accordingly, the page cache "layer" contains computer executable instructions executed by the CPU 210 to perform operations in accordance with the technique described herein. Illustratively, a service (e.g., one or more threads of execution on CPU 210) processing messages directed to the volume layer may execute instructions that implement the page cache in memory 220. For every metadata page that is accessed in response to a read request, the page cache is checked and, if it is not found in the cache, the metadata page is read (retrieved via a message request) from the extent store layer. If a metadata page is not found in the page cache 1400, duplicate accesses (e.g., read requests) may be de-duplicated, e.g., only a first read request is passed to the extent store while other read requests are loaded into a wait queue pending completion of the first read request. Notably, a plurality of services may each implement a different metadata page cache associated with a region (i.e., a dense tree) such that concurrent access is allowed. That is, the services may concurrently process message requests to read metadata pages from different dense trees each associated with its own page cache.

Figure 14:
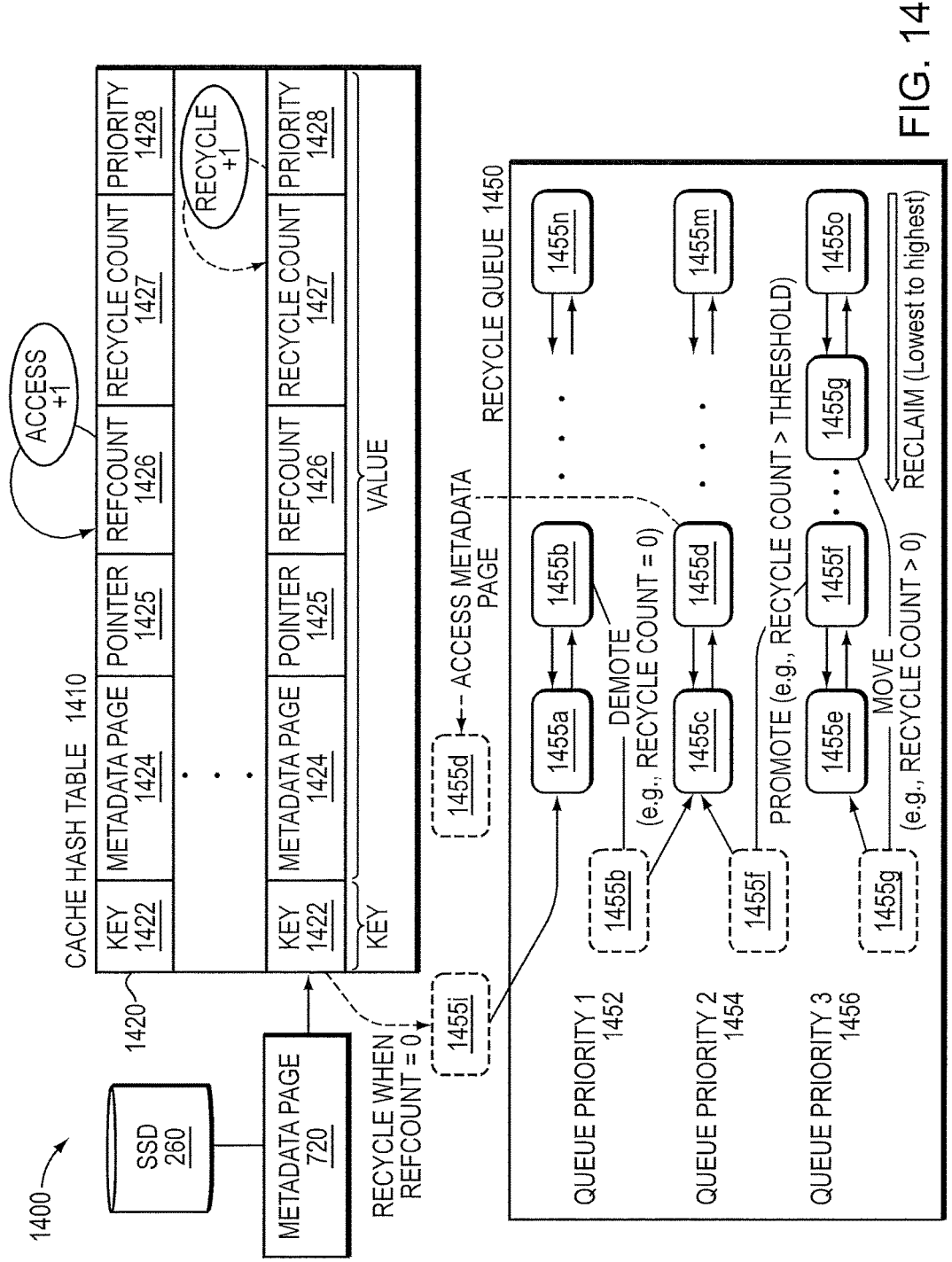
FIG. 14 is a block diagram of a page cache.

FIG. 14 is a block diagram of a page cache that may be advantageously used with one or more embodiments described herein. The page cache 1400 is organized as data structures configured to maintain properties of Least Recently Used (LRU) and Least Frequently Used (LFU) for metadata pages in the cache. Illustratively, a first data structure is a hash table 1410 storing the key-value pairs (e.g., an extent key and associated metadata page) and a second data structure is a multi-level recycle queue 1450 for reclaiming cached metadata pages no longer referenced in-core. A reference count is maintained for each cached metadata page such that when the count reaches a sentinel value (e.g., zero), the metadata page may be inserted into the recycle queue 1450 for reclamation (i.e., may be evicted). Similarly, if accessed (i.e., a read request for the metadata page), the metadata page may be moved out of the recycle queue. According to the technique, the LRU property may be implemented by temporal ordering of metadata pages in the recycle queue 1450, whereas the LFU property may be implemented via a recycle counter maintained for each metadata page that indicates a number of times a metadata page is moved into the recycle queue (i.e., a number of times the metadata page is used and discarded). The recycle queue 1450 thus controls (manages) the metadata page stored in the hash table 1410 based on spatial and temporal locality of the page. Note that referenced metadata pages are maintained in-core (i.e., cannot be evicted) until completely unreferenced and moved to the recycle queue 1450 and thus subject to eviction (i.e., reclamation in the recycle queue).

In an embodiment, the hash table 1410 is organized as a plurality of entries 1420, each of which stores a key-value pair grouped into the following fields: a first group ("key") having a key field 1422 that stores an extent key 618 and a second group ("value") having a metadata page field 1424 that stores a dense tree metadata page 720, a pointer field 1425 storing a pointer that references a corresponding element 1455 of the recycle queue (as described below), a reference count (refcount) field 1426 storing a value indicating a number of references to the metadata page, and a recycle count field 1427 storing a value indicating a number of times the metadata page is moved (i.e., inserted) into the recycle queue. Note that each hash table entry 1420 (i.e., key-value pair) may be a fixed size since the content of each field may be a fixed size, e.g., 4 Kbytes for the metadata page and 40 bits for the associated extent key. As a result, a load factor (fullness) of the hash table 1410 may be adjusted by controlling a number of buckets and size of each bucket for the hash table. Moreover, near-constant time access to a metadata page may be achieved given the extent key. Note also that each metadata page has a unique identifier (ID), which guarantees that no two metadata pages can have the same content and, thus, have unique extent keys.

In an embodiment, the recycle queue 1450 is illustratively organized as a multi-level data structure, e.g. queues of levels 1452, 1454, 1456, wherein each level denotes (indicates) a priority that is provided with the metadata page at the time of its insertion into the hash table 1410 of the page cache. Each level of the recycle queue is organized as a doubly-linked list of elements 1455a-o, wherein each element points (e.g., via a pointer, not shown) to a corresponding metadata page in the hash table 1410 and each metadata page points back (via the pointer in field 1425 of the hash table key-value pair) to that element in the queue. A position of the element within the doubly-linked list (i.e., ordinal ranking) denotes how recently the metadata page corresponding to the element was accessed, e.g., via a lookup (i.e., the ordinal ranking of access to the metadata page is based on the position of the element within the doubly-linked list), thus maintaining the LRU property of the page cache. Notably, the recycle queue 1450 also transforms the page cache 1400 into a priority cache by controlling the metadata page 720 stored in the cache based on its priority. For example, the technique may configure the page cache 1400 such that the element at a head of each level of the queue is ascribed a highest priority and, as well as, a most recent use.

Each key-value pair may be inserted into the cache at a given priority, wherein the priority (e.g., queue priority 1-3) is indicated by the level (e.g., 1452-1456, respectively) at which the element 1455 corresponding to the value (metadata page) of the pair is held in the recycle queue. Illustratively, a metadata page is inserted into the recycle queue as an element 1455i when its reference count (of recount field 1426) in the hash table 1410 reaches zero, so that the metadata page may be evicted (i.e., reclaimed). In addition, the recycle count of field 1427 of hash table key-value pair associated with the metadata page may be incremented to reflect a frequency of use, i.e., a number of times that the metadata page is accessed from the cache and thus is removed/inserted into the recycle queue. Within a level, the element 1455i corresponding to a new (i.e., ready for reclamation) metadata page is inserted at the head of the queue for that level, i.e., the newly inserted metadata page is ascribed the highest priority within the level. In response to a key-value pair lookup (i.e., access to a metadata page), an element, e.g., element 1455d of level 1454 (queue priority 2) corresponding to the metadata page of the pair is removed from the recycle queue. Removal of the element from the recycle queue renders the metadata page essentially ineligible for reclamation (cannot be evicted since it is being accessed).

Multiple lookups of the same metadata page may be tracked by incrementing the reference count of refcount field 1426 of the key-value pair associated with the metadata page. When the reference count decrements to zero, the element is reinserted into the recycle queue such that the value (metadata page) is eligible for reclamation. That is, the presence of an element in a level of the priority queue renders the metadata page eligible for reclamation. Removal and insertion of an element corresponding to a metadata page may be referred to as a "recycle" of that metadata page as tracked by its associated recycle count in field 1427 of the hash table. Accordingly, a greater recycle count value for a metadata page indicates a greater frequency of use for that page (i.e., a greater probability that the page is accessed) and a correspondingly higher position within the recycle queue to forestall its reclamation. In contrast, pages with a lower likelihood of use (i.e., lower recycle count) may be inserted at a lower priority in the recycle queue so that those pages may be recycled earlier than pages with a higher recycle count.

To prevent higher priority "stale" metadata pages that have not been recently accessed (i.e., aged) from polluting (impeding) the page cache, the priorities of the aged metadata pages are periodically demoted and ascribed a lower priority. The recycle count is used to calculate priority aging according to each priority level. That is the recycle count associated with an element (metadata page) may reset when the element moves between priority levels. According to the technique, a determination is rendered as to whether the one or more most aged (oldest) elements (e.g., element 1455b) on a recycle queue (e.g., of level 1452) is eligible for priority demotion. For example, element 1455b having a recycle count of zero denotes that the element has not been accessed since it was moved to its priority (or since the last time it was checked); accordingly, the priority of the element is eligible for demotion. An element (e.g., element 1455g) having a recycle count of nonzero denotes that the element has been accessed since the last time it was checked while at a same priority level (i.e., while remaining in a same priority queue). According to the technique, when the recycle count is greater than zero, the recycle count is zeroed and the element (e.g., element 1455g) is inserted at the head of the queue (e.g. of level 1456) to extend the "life" of the corresponding metadata page in the cache, i.e., allow the page to exist on the queue for a longer time. By marking the recycle count of the element to zero, the frequency of access of the metadata page in the cache may be checked the next time the element makes it to the tail of the priority queue (e.g., of level 1456) in the recycle queue. As previously noted, when demoting an element to a lower priority level, the element's recycle count is illustratively marked to zero. Similarly, lower priority metadata pages (e.g., element 1455f) may be moved (e.g., from lower priority queue of level 1456 to higher priority queue of level 1454) to have their priorities promoted after they have been accessed a predetermined number of times (e.g., exceeding a threshold) to allow them to live in the cache longer.

As used herein, reclamation is the procedure of reclaiming (or removing) the lowest priority values from the page cache. In an embodiment, a daemon (not shown) illustratively running out-of-band from read path 500 (i.e., out-of-band from the service process) may be used to execute the reclaiming procedure. Reclamation starts at a tail (e.g., element 1455o) of the lowest level (e.g., queue priority 3 of level 1456) of the recycle queue 1450 and moves to the head (e.g., element 1455e) of that level before proceeding on to a higher priority level (e.g., queue priority 2 of level 1454). Illustratively, reclamation is performed to maintain the size of the page cache while maintaining memory utilization within certain limits. Triggers for reclamation may be customized, for example, if the memory consumption reaches a predetermined level, permitting a predetermined percentage of metadata pages (i.e., recycle queue elements) eligible for reclamation to be reclaimed.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
a processor of a storage system; and
a memory coupled to the processor and configured to store a storage input/output (I/O) stack executable by the processor, the memory including a page cache configured to provide caching of metadata managed by the storage I/O stack, the metadata embodied as mappings from logical block addresses of a logical unit to extent keys associated with storage locations of extents organized as metadata pages, the page cache including a hash table having one or more entries, each entry configured to store a metadata page indexed by an extent key, the page cache further including a recycle queue configured to maintain a Least Recently Used (LRU) property of the metadata page based on an ordinal ranking of the metadata page in the recycle queue, wherein the recycle queue is further configured to maintain a Least Frequency Used (LFU) property of the metadata page based on a recycle count indicating a number of times that the metadata page is moved into the recycle queue.

2. The system of claim 1 wherein the recycle queue is configured to transform the page cache into a priority cache by controlling the metadata page stored in the page cache based on priority.

3. The system of claim 1 wherein the extent key is calculated from a hash of the metadata page.

4. The system of claim 2 wherein the recycle queue comprises a multi-level data structure, wherein each level indicates a different priority associated with each metadata page, and wherein the recycle count of the metadata page is reset when the metadata page changes priority.

5. The system of claim 4 wherein each level of the recycle queue is organized as a doubly-linked list of elements and wherein each element has a first pointer referencing a corresponding entry in the hash table that includes a second pointer referencing the element in the recycle queue.

6. The system of claim 5 wherein a position of the element within the doubly-linked list indicates the ordinal ranking of the metadata page in the recycle queue corresponding to the LRU property of the metadata page.

7. The system of claim 5 wherein each entry of the hash table includes a pointer field configured to store a third pointer that references a corresponding element of the recycle queue.

8. The system of claim 7 wherein each entry of the hash table further includes a reference count field configured to store a first value indicating a number of references to the metadata page of the entry.

9. The system of claim 4 wherein the metadata page is periodically ascribed a lower priority.

10. A method comprising:
storing a storage input/output (I/O) stack in a memory coupled to a processor, the storage I/O stack executable by the processor to manage metadata cached in a page cache of the memory, the metadata embodied as mappings from logical block addresses of a logical unit to extent keys associated with storage locations of extents organized as metadata pages;
organizing the page cache as a hash table and a recycle queue;
storing a metadata page in an entry of the hash table;
indexing the metadata page by an extent key; and
controlling the metadata page stored in the hash table using the recycle queue to maintain a Least Recently Used (LRU) property of the metadata page base on an ordinal ranking of the metadata page in the recycle queue, and using the recycle queue to maintain a Least Frequently Used (LFU) property of the metadata page based on a recycle count indicating a number of times that the metadata page is moved into the recycle queue.

11. The method of claim 10 wherein controlling the metadata page comprises:
controlling the metadata page stored in the page cache based on priority to transform the page cache into a priority cache.

12. The method of claim 11 further comprising:
calculating the extent from a hash of the metadata page.

13. The method of claim 11 further comprising:
organizing the recycle queue as a multi-level data structure, wherein each level indicates a priority associated with each metadata page, and
resetting the recycle count of the metadata page when the metadata page changes priority.

14. The method of claim 13 further comprising:
organizing each level of the recycle queue as a doubly-linked list of elements, wherein each element has a first pointer referencing a corresponding entry in the hash table that includes a second pointer referencing the element in the recycle queue.

15. The method of claim 14 further comprising:
indicating the ordinal ranking of the metadata page in the recycle queue corresponding to the LRU property of the metadata page.

16. The method of claim 14 further comprising:
storing a third pointer that references a corresponding element of the recycle queue in a pointer field of each entry of the hash table.

17. The method of claim 16 further comprising:
storing a first value indicating a number of references to the metadata page of each entry in a reference count field of the entry of the hash table.

18. The method of claim 13 further comprising:
periodically ascribing a lower priority to the metadata page.

19. A non-transitory computer readable medium including program instructions for execution on a processor of a storage system, the program instructions configured to:
- store a storage input/output (I/O) stack in a memory coupled to a processor, the storage I/O stack executable by the processor to manage metadata cached in a page cache of the memory, the metadata embodied as mappings from logical block addresses of a logical unit to extent keys associated with storage locations of extents organized as metadata pages;
- organize the page cache as a hash table and a recycle queue;
- store a metadata page in an entry of the hash table;
- index the metadata page by an extent key; and
- control the metadata page stored in the hash table using the recycle queue configured to maintain a Least Recently Used property of the metadata page based on an ordinal ranking of the metadata pages in the recycle queue, wherein recycle queue is further configured to maintain a Least Frequently Used property of the metadata page based on a recycle count indicating a number of times that the metadata page is moved into the recycle queue.

20. The non-transitory computer readable medium of claim 19 wherein the program instructions configured to control the metadata page are further configured to:
- control the metadata page stored in the page cache based on priority to transform the page cache into a priority cache.

* * * * *